June 5, 1956  R. GILMONT ET AL  2,749,221
APPARATUS FOR THE CONTINUOUS QUANTITATIVE DETERMINATION OF GASES
Original Filed March 15, 1951  4 Sheets-Sheet 1

INVENTORS
ROGER GILMONT
BY MORRIS J. SCHWARTZ
ATTORNEY

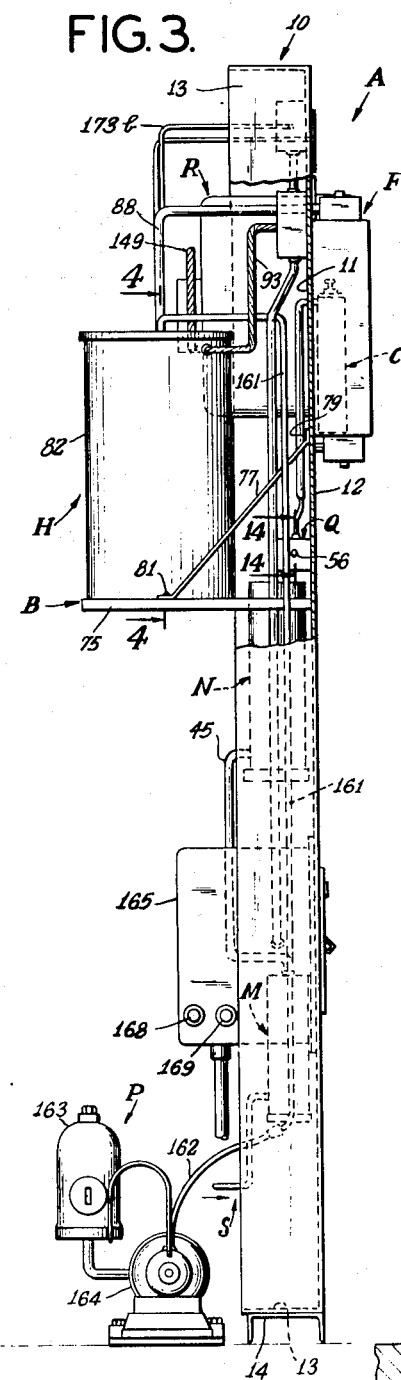

June 5, 1956 R. GILMONT ET AL 2,749,221
APPARATUS FOR THE CONTINUOUS QUANTITATIVE DETERMINATION OF GASES
Original Filed March 15, 1951 4 Sheets-Sheet 3
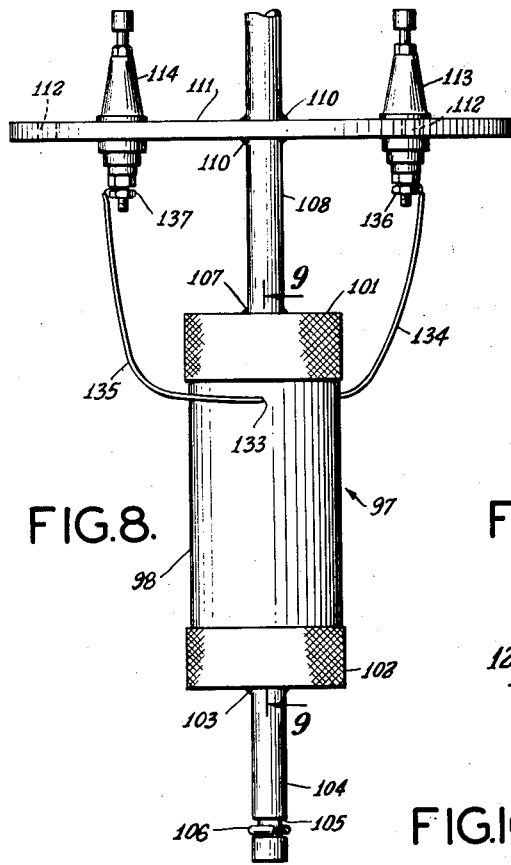
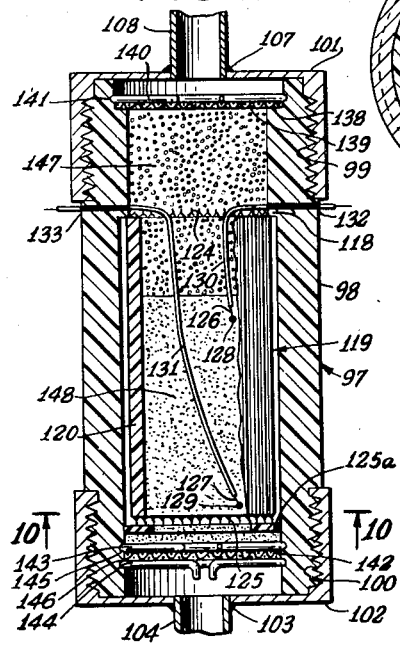
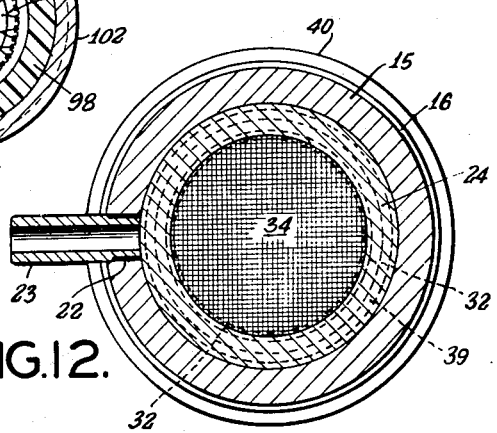
INVENTORS
ROGER GILMONT
BY MORRIS J. SCHWARTZ
ATTORNEY

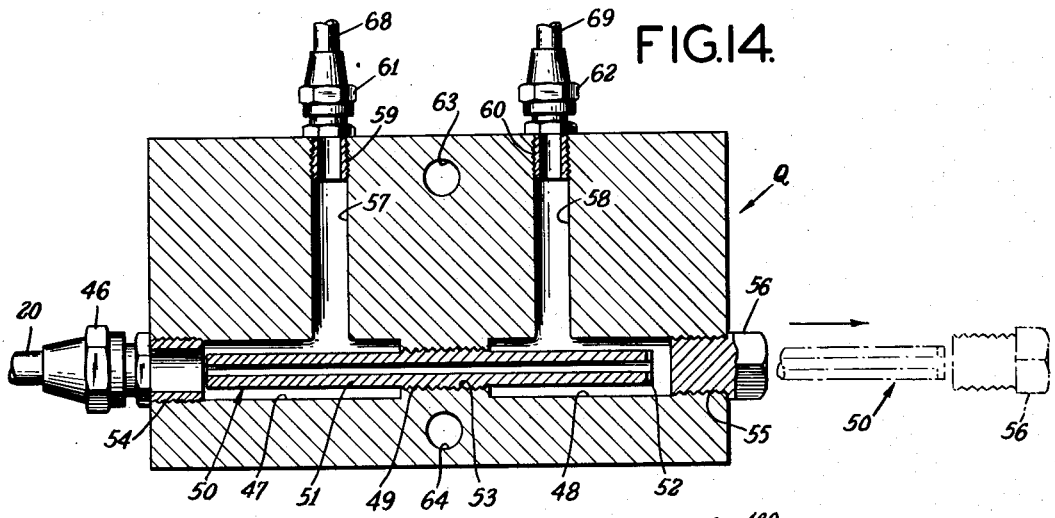
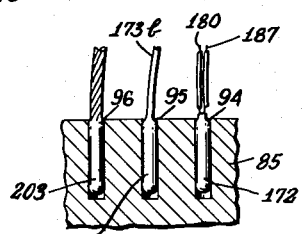
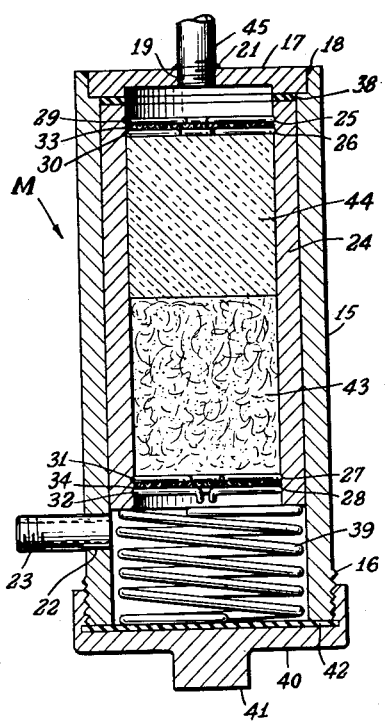
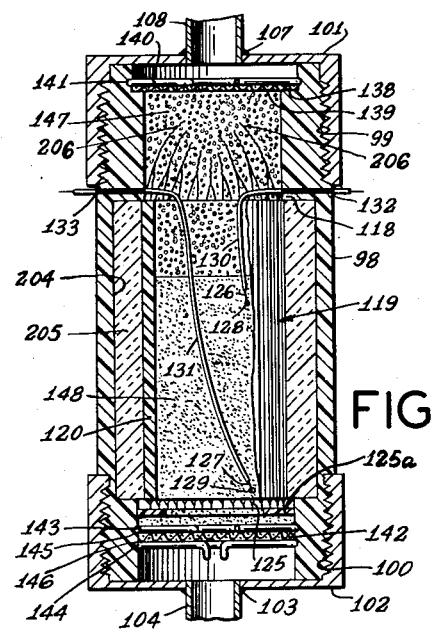

United States Patent Office 2,749,221
Patented June 5, 1956

2,749,221

APPARATUS FOR THE CONTINUOUS QUANTITATIVE DETERMINATION OF GASES

Roger Gilmont and Morris J. Schwartz, Brooklyn, N. Y., assignors to Benjamin Cooper, Brooklyn, N. Y.

Original application March 15, 1951, Serial No. 215,848. Divided and this application November 22, 1952, Serial No. 322,062

7 Claims. (Cl. 23—255)

This application is a divisional application of an application, Serial No. 215,848, for Apparatus for the Continuous Quantitative Determination of Gases, filed March 15, 1951, now Patent No. 2,683,793, issued July 13, 1954.

This invention relates to an improved apparatus for the continuous quantitative determination of combustible gases and is particularly directed to an apparatus for determining the quantity of carbon monoxide present in air, although it can also be used for quantitatively measuring the content of other gases in air.

It has long been recognized that carbon monoxide is a deadly gas, even in very small concentrations. It is a great hazard as it is produced in many industrial operations and by internal combustion engines. It gives no warning as it is colorless and odorless and diffuses readily, having about the same density as air.

In the Bureau of Mines Technical Paper No. 355 there is described a carbon monoxide analyzer device including essentially a sample purifying apparatus, a flow regulator and flow meter, a reaction cell heated to a temperature of 100° C. and containing a thermopile to measure the heat of oxidation of carbon monoxide in the presence of Hopcalite as a catalyst, and a gas pump for continuously circulating the tested gas through the system. Gas flow was controlled and measured by water containing devices and the operating temperature of 100° C. was produced by a steam bath. The principal difficulties with this type of apparatus were that great care and attention was required to keep the steam bath and the water operated gas flow devices in proper working order despite the adverse effects of evaporation and, in the case of the steam bath, boiling off. The present invention relates to improvements in such a device resulting in a practical, rugged and easily maintained gas analyzer.

It is accordingly one object of this invention to provide an apparatus of the character described wherein the reaction cell unit is within a thermostatically controlled electrically heated metal block.

It is another object of this invention to provide an apparatus of the character described wherein control and metering of the sample gas flow is accomplished without the use of devices containing water or similar liquids.

It is another object of this invention to provide an improved sensitive device of the character described capable of accurately and continuously measuring small quantities of carbon monoxide present in air so that corrective ventilation measures can be taken to insure a non-toxic air condition in an enclosed space at all times.

It is another object of this invention to provide an improved apparatus for quantitatively measuring the presence of combustible gases such as hydrogen and methane in air.

It is another object of this invention to provide a device of the character described comprising comparatively few and simple parts, which shall be relatively inexpensive to manufacture and maintain, and which shall nevertheless be practical and efficient to a high degree in use.

Other objects of this invention will in part be obvious and in part hereinbelow pointed out.

The invention accordingly consists in the features of construction, combination of elements and arrangement of parts which will be exemplified in the construction hereinafter described and of which the scope of application will be indicated in the appended claims.

In the accompanying drawings, in which one of the various possible illustrative embodiments of this invention is shown, Fig. 1 shows a rear elevational view of a gas analyzer panel embodying this invention;

Fig. 3 shows a side elevational view taken on line 3—3 of Fig. 1;

Fig. 4 is a cross-sectional view taken on line 4—4 of Fig. 3, showing the reaction cell heater with the reaction cell in place;

Fig. 5 is a horizontal cross-sectional view taken on line 5—5 of Fig. 4;

Fig. 6 is a horizontal cross-sectional view taken on line 6—6 of Fig. 4;

Fig. 7 is an enlarged partial view of Fig. 4 showing the slide fit connection between the sample gas line in the heater block and the reaction cell unit;

Fig. 8 is an assembly view of the reaction cell unit;

Fig. 9 is a cross-sectional view taken on line 9—9 of Fig. 8;

Fig. 10 is a cross-sectional view taken on line 10—10 of Fig. 9;

Fig. 11 is a vertical cross-sectional view of the charcoal filter unit taken on line 11—11 of Fig. 1;

Fig. 12 is a cross-sectional view taken on line 12—12 of Fig. 11;

Fig. 13 is a cross-sectional view of the steel-wool and glass-wool filter unit taken on line 13—13 of Fig. 1;

Fig. 14 is a cross-sectional view of the orifice block taken on line 14—14 of Fig. 3;

Fig. 15 is a partial sectional view taken on line 15—15 of Fig. 5;

Figure 16 is a cross-sectional view of a modified reaction cell unit.

Figure 1:
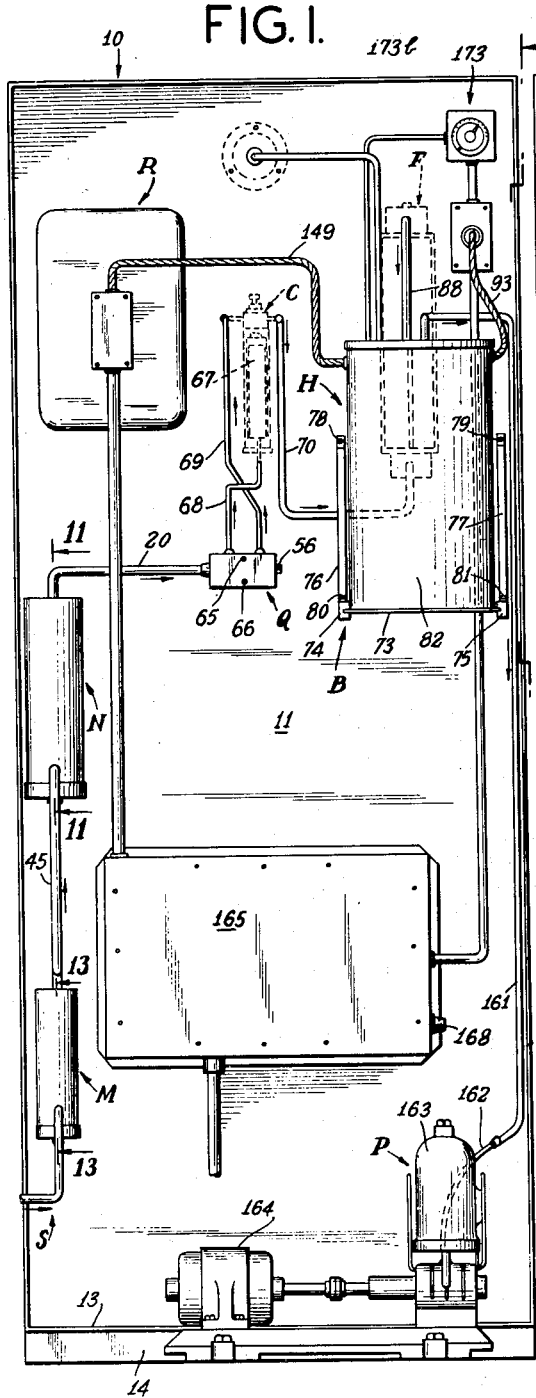

Referring now to the drawings, A designates a gas analyzer panel embodying the invention. A brief description of its operation is as follows: The motor driver rotary vacuum pump P draws a sample of air to be analyzed through a sampling line S, thence through filter units M and N, wherein objectionable impurities such as dust, oil particles and certain hydrocarbon vapors are removed, thence through orifice block Q and cartesian manostat C, serving in combination to regulate the rate of flow of the sample gas through the apparatus to about 8.5 liters per minute. Measurement of the flow rate for adjustment and monitoring purposes is indicated by a flowmeter F following the flow regulator apparatus. From the flowmeter the gas sample passes into a thermostatically controlled heater block H, wherein it is heated and passed through a Hopcalite type reaction unit centrally located in the heater block. The use of Hopcalite as a catalyst in gas measuring apparatus is well known in the art.

As hereinbelow detailed, said cell contains a thermopile furnishing an output voltage proportional to the carbon monoxide concentration in the sample gas. This output voltage circuit is connected to a sensitive recording device R serving to transcribe a continuous record of the percentage carbon monoxide concentration of the sample air passing through the analyzer on a moving chart.

Considering now the detailed construction of the analyzer, the same comprises an upright rectangular steel panel 10 having a rear face 11, a front face 12, and a rearwardly extending peripheral flange 13. Said flange at the bottom end of the panel is welded to a steel channel iron 14 which may be bolted to the flooring.

Fixed against rear face 11 of the analyzer panel are filter units M and N, functioning to remove impurities in the gas sample flowing through the apparatus, which might vitiate the Hopcalite in the reaction cell, or otherwise interfere with the proper operation of the analyzer. These filter units contain replaceable charges of filter material and differ only in size and the type of filter material contained.

Filter unit N, Figs. 11 and 12, comprises a cylindrical shell 15, externally threaded at its lower end as at 16 and capped at the upper end by a circular end piece 17 welded therein as at 18. Said end piece is centrally drilled and tapped as at 19 to receive tubular gas conduit 20 welded therein as at 21. The side wall of shell 15 near threaded end 16 is drilled as at 22 and fitted with a short conduit coupling piece 23 welded therein.

The filter charge unit comprises a cylindrical container 24 slidable within cylindrical shell 15 and provided with a pair of internal semi-circular ring grooves 25 and 26 at one end and a similar pair of ring grooves 27 and 28 at the other end. Said pairs of ring grooves are fitted with readily removable retainer ring springs 29 and 30, and 31 and 32, each having circular wire screen pieces 33 and 34, respectively, therein between disposed.

In filter unit N, container 24 is filled with a central charge of activated charcoal 35 and glass wool and plugs 36 and 37 serving to retain the charcoal charge in place. Said charge is easily replaceable by removing one of the outer retainer ring springs and its adjacent screen.

Container 24 is disposed in cylindrical shell 15 up against a circular gasket 38, preferably of rubber, fitted against the inner side of end piece 17. Said container is held in place by the compressional force imparted by coil spring 39 held thereagainst by internally threaded cap 40 threaded on threads 16. Said cap is provided with a hexagonal stud 41 in its outer face for easy removal with a small wrench. Said cap is further provided with a circular rubber gasket 42 to insure an air-tight closure of the filter shell.

It will now be evident that all of the gas sample drawn in through coupling 23 and out through conduit 20 will find passage only through lower screen 34, filter material 37, 35 and 36 and upper screen 33.

Filter unit M (Fig. 13) is similar in construction to filter unit N, above described, except that it is somewhat smaller in size and has in its filter charge container 24 a charge of steel wool 43 at its lower half and glass wool 44 at its upper half.

Referring to Fig. 1, it is shown that sampling tube S connects to coupling 23 of filter unit M. Filter units M and N are interconnected by conduit 45. Conduit 20 of filter unit N is connected to orifice block Q as by coupling 46 (Fig. 14).

Said orifice block comprises a rectangular block, preferably of glass, drilled from each end nearly to the center of the block as at 47 and 48, said drilled holes being coaxially aligned. The central portion between the inner ends of said drilled holes is coaxially drilled and threaded to a smaller diameter as at 49 for retaining screwed therein an orifice member 50. Said orifice member comprises an axially drilled rod 51 slotted at one end for receiving a screwdriver as at 52 and provided with external threads 53, centrally located along its outer length, for cooperative engagement with threads 49 in the orifice block.

Drilled holes 47 and 48 are internally threaded at their outer ends as at 54 and 55, hole 47 being threaded to accommodate coupling unit 46 and hole 48 being threaded to accommodate a plug 56. It is through this plug opening that orifice member 56 can readily be removed, by means of a screwdriver, from the orifice block for cleaning. (See dashed line representation of removed plug and orifice member.)

Said orifice block is provided with a pair of holes 57 and 58 drilled from one side of the block and communicating at right angles with holes 47 and 48 respectively. Said holes are internally threaded at their outer ends as at 59 and 60 to receive connector units 61 and 62 respectively. Said orifice block is further provided with a pair of mounting holes 63 and 64 through which screws 65 and 66 may secure the block to panel face 11.

Figure 2:
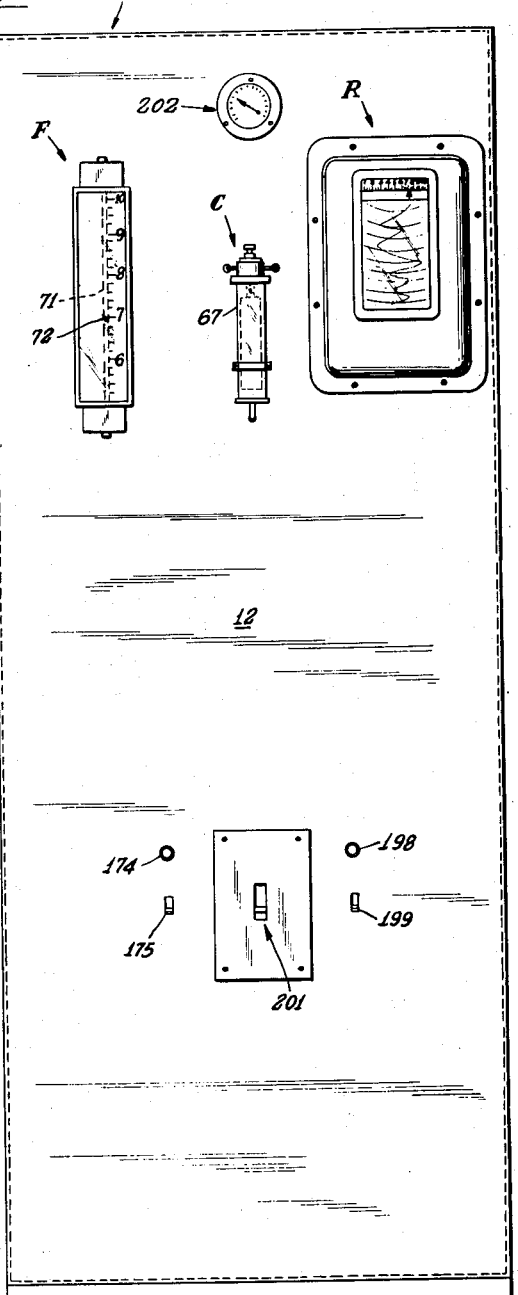
Fig. 2 shows a front elevational view of same.

The flow rate of the sample gas pumped through the analyzer is regulated to about 8.5 liters per minute by a cartesian manostat C, fixed to the front of panel face 12, having a float 67 acting as a throttling valve (Fig. 2). The pressure to operate said float is developed across the orifice member 51 in orifice block Q and connected to said cartesian manostat by conduits 68 and 69. Such a cartesian manostat is manufactured and sold by the Emil Greiner Co. of 20 N. Moore St., New York city, and described in detail in their bulletin No. ICM96, titled "Automatic Vacuum and Pressure Control."

Means is provided to continuously indicate the rate of flow of the sample gas through the analyzer. To this end there is provided a flowmeter F mounted on front face 12 of the analyzer panel and connected to the output of cartesian manostat C by a conduit 70. Said flowmeter is preferably one of the type having a tapered and calibrated glass tube 71 within which there is a float 72 which rises within the tube in proportion to the rate of gas flow through the tube. Such a flowmeter is manufactured and sold by the Brooks Rotometer Co. of Lansdale, Pennsylvania, and is described in their drawing No. 1012.

Heater block H is set on a bracketed shelf B and held in place by the connections of its gas conduits and electrical cables to the rest of the analyzer system. Said shelf comprises a bottom plate 73 fixed between grooved side pieces 74 and 75 mounted against and extending from back face 11 of the analyzer panel and supported at their outer ends by brace pieces 76 and 77. Said brace pieces are fixed at one end as by screws 78 and 79 to rear panel face 11 and by screws 80 and 81 and their other ends to side pieces 74 and 75 respectively.

Heater block H comprises a cylindrical metallic container 82 open at its top end. The inner walls of said container are insulated as by glass fiber insulation layers 83 at the bottom and 84 around the inside wall (Figs. 4 and 5). Disposed within said insulated container is a cast aluminum heater member 85, cylindrical in shape and having cast within it several coils of a stainless steel tubing 86, in helical formation coaxial with said cylindrical heater member. Said heater member is provided with a central, cylindrical cavity 87 extending from its top end nearly to its bottom end. Stainless steel tubing 86 terminates at its upper end in an upwardly extending arm 88 for connection to the down-stream end of flowmeter F. The other end of said stainless steel tubing terminates within the cavity and at the bottom thereof in a slide connector block 89 to which it is welded as by weld 90 (Fig. 7).

Heater member 85 is electrically heated by means of a fiber glass insulated nichrome wire heater element 91 wound around its outside cylindrical surface and so spaced as to provide extra heat input near the top of the coiled tubing 86 where the sample gas flowing is coldest. The ends of said heater winding are brought out to a terminal strip 92 mounted on the top of said heater member where they connect to wires in a cable 93 connecting to the electrical heat control circuit hereinbelow described.

To provide for the installation of remotely controlled temperature operated devices, hereinbelow described, heater member 85 is further provided near its outer cylindrical surface with three bored holes 94, 95, and 96, extending from the top of said member vertically down for a distance of three or four inches.

Reaction cell unit 97 (Figs. 4, 8 and 9) disposed within cavity 87 of heater member 85 comprises a chemically inert, cylindrical casing of low heat conductivity 98, externally threaded at each end as at 99 and 100 to provide for assembly to upper and lower metallic, internally threaded cap members 101 and 102 respectively. Said casing is preferably machined of the plastic material tetra-flouroethylene resin, known commonly as "Teflon," manufactured by E. I. DuPont de Nemours Co. Inc. Cap member 102 has welded to it as at 103 at a central opening therein a length of tubing 104 provided with an annular groove 105 near its outer end in which is disposed a heat resistant silicone composition O ring gasket 106. Such a gasket can be procured from Linear, Inc., of State Road and Levick Street, Philadelphia 35, Pa.

Cap member 101 has welded to it as at 107 at a central opening therein a length of tubing 108 provided with a coupling member 109 at its remote end. Intermediate said last cap member and coupling member on said length of tubing, coaxially disposed and welded thereto as at 110, is a circular mounting number 111 provided equi-distantly spaced within a concentric circle with three mounting holes 112, and a pair of feed-through insulators 113 and 114.

Reaction cell unit 97 is easily assembled to the heater member 86 by placing the end of tubing 104 into close-fitting cylindrical opening 115 in slide connector block 89 and sliding it down until the underside of mounting member 111 seats against the top of the heater member 86 to which it is held in place by machine screws 116 through holes 112 in said mounting members and screwed into tapped holes 117 in said heater member (Fig. 5). The sealing action of O ring 106 squeezed between opening 115 in the connector block 89 and the inner circumference of groove 105 serves to insure a gas-tight connection for sample gas flow through the reaction cell unit.

There is disposed against shoulder 118 within casing 98 of the reaction cell unit a thermopile assembly 119 comprising a length of plastic tubing 120 having a plurality of equi-distantly spaced longitudinal grooves 121 in which are disposed alternately Chromel wires 122 and constantan wires 123, the adjacent dissimilar wires being twisted and silver-soldered to form thermoelectric junctions 124 and 125 at the upper and lower ends respectively of said thermopile assembly. Said thermopile unit has adjacent its lower end for the purpose of insulating thermoelectric junctions 125, an annular plastic gasket 125a (Figs. 9 and 10). The output terminals 126 and 127 of said thermopile are threaded through close-fitting holes 128 and 129 into the interior of tubing 120, insulated as by insulation pieces 130 and 131 and fed through holes 132 and 133 to the outside of casing 98. Said thermopile conductors external of the casing 98 are insulated by insulation pieces 134 and 135 and terminate at the underside of feed-through insulators 113 and 114, being held thereto respectively as by retaining nuts 136 and 137.

There is fitted against internal shoulder 138 near the upper end of casing 98 a circular wire mesh piece 139 held in place thereagainst as by a circular retainer spring 140 positioned in annular groove 141. The lower end of casing 98 is enclosed by a circular wire mesh piece 142 retained in place by a pair of circular retainer springs 143 and 144 disposed in grooves 145 and 146 respectively. The space between wire mesh pieces 139 and 142 is filled to about halfway down, so as to surround "cold" thermo-couple junctions 124, with a chemically inert material 147 such as pumice, and the remainder is preferably filled, so as to surround "hot" thermo-couple junctions 125, with a carbon monoxide catalyst 148, known to the trade as Hopcalite.

Fig. 16 shows a modified reaction cell unit differing from that shown in Fig. 9 in that casing 98 is provided with an internal groove 204 disposed in which is a layer of fiber glass insulation 205 serving to further insulate thermopile unit 119 from the rest of the reaction cell. The only other difference is that "hot" thermopile junctions 206 are distributed longitudinally about the axis of Hopcalite material 147. This is done because it has been found that in prolonged use the Hopcalite near the bottom becomes less active, and the center of reaction and consequent heat proceeds gradually toward the top end of the Hopcalite. By this method of distributing the "hot" thermopile junctions along the vertical axis, equal average thermopile voltages will result for a given gas conservation even in prolonged use.

Connection is made to the thermopile by a two wire cable 149 entering the side of container 82 and connecting to the outer terminals of feed through insulators 113 and 114 (Figs. 1 and 4).

Cover means is provided to further insulate the heater member 85. The same comprises a pair of complementary semicircular skirted cover parts 150 and 151 each insulated at its under side by layers of fiber glass insulation 152 and 153 retained in place as by clamps 154 and 155 held in place respectively as by screws 156 and 157. Openings 158, 159 and 160 are provided between said cover parts for entrance of conduit tubes 88 and 108 and cables of the thermally operated devices hereinbelow described (Figs. 4 and 6).

Coupling member 109 is connected to a conduit 161 mounted against the inner face 11 of the analyzer panel. Said conduit terminates in connection to a length of flexible tubing 162 which in turn is connected to a rotary vacuum pump 163. Said pump is driven by an electric motor 164 connected in an electric circuit hereinbelow described.

Means is provided to regulate and control the electrical power input to heater block H so that it remains substantially at a constant level corresponding to a block temperature of about 145° C. after the initial warm-up period. This means is completely described in the cited copending application and need not be described herein as it forms no part of the present invention.

It will thus be seen that there is provided an apparatus in which the several objects of this invention are achieved and which is well adapted to meet the conditions of practical use. As various possible embodiments might be made of the above invention, and as various changes might be made in the embodiment above set forth, it is to be understood that all matters herein set forth or shown in the accompanying drawings are to be interpreted as illustrative and not in a limiting sense.

The invention claimed is:

1. In a gas analyzer, the combination comprising a cylindrical metal block, electrical means circumjacently disposed around the outer periphery of said block and adapted to heat said block, tubing adapted to receive gas to be tested comprising a plurality of continuous turns of metallic tubing integrally imbedded within said block and helically disposed about its axis and said tubing having the inlet end thereof disposed externally of said block, a longitudinal central opening in said block communicating with the top thereof, a gas sensitive reaction cell unit adapted to be mounted in within said opening in equally spaced relation to the internal periphery of the block, and means interconnecting the outlet end of said metallic tubing with the inlet end of said unit to permit gas to pass from said tubing to said unit, and outlet means on said unit extending externally of the block.

2. In a gas analyzer, the combination comprising, a cylindrical metal block, electrical means to heat said block, tubing adapted to receive gas to be tested comprising a plurality of continuous turns of metallic tubing integrally imbedded within said block and helically disposed about its axis and said tubing having the inlet end thereof disposed externally of said block, a longitudinal central opening in said block, a gas sensitive reaction cell unit within said opening, and means interconnecting the outlet end of said metallic tubing with the inlet end of said unit to permit gas to pass from said tubing to said unit, said heating means comprising a helical winding of insulated resistance wire circumjacently disposed around the external periphery of said block.

3. In a gas analyzer, the combination comprising, a cylindrical metal block, electrical means to heat said block, tubing adapted to receive gas to be tested comprising a plurality of continuous turns of metallic tubing within said block and helically disposed about its axis and said tubing having the inlet end thereof disposed externally of said block, a longitudinal central opening in said block, a gas sensitive reaction cell unit mounted within said opening, and means interconnecting the outlet end of said metallic tubing with the inlet end of said unit to permit gas to pass from said tubing to said unit, said heating means comprising a helical winding of insulated resistance wire circumjacently disposed around the external periphery of said block, said resistance wire winding being closer wound adjacent to the top of said block and gradually increasing in separation as the winding progresses to the bottom of said block.

4. In a gas analyzer, the combination comprising, a cylindrical metal block, electrical means to heat said block, tubing adapted to receive gas to be tested comprising a plurality of continuous turns of metallic tubing imbedded within said block and helically disposed about its axis and said tubing having the inlet end thereof disposed externally of said block, a longitudinal central opening in said block, a gas sensitive reaction cell unit within said opening, means interconnecting the outlet end of said metallic tubing with the inlet end of said unit to permit gas to pass from said tubing to said unit, said heating means comprising a helical winding of insulated resistance wire circumjacently disposed around the outside of said block, and insulation at the top, bottom and around said block.

5. In a gas analyzer, the combination comprising, a cylindrical metal block, electrical means to heat said metal block, tubing adapted to receive gas to be tested comprising a plurality of continuous turns of metallic tubing imbedded within said metal block and helically disposed about its axis and said tubing having the inlet end thereof disposed externally of said block, a longitudinal central opening in said metal block communicating with the top thereof, a gas sensitive reaction cell unit within said opening disposed in equally spaced relation from the internal periphery of the block, means interconnecting the outlet end of said metallic tubing with the inlet end of said unit to permit gas to pass from said tubing to said unit, said connecting means comprising a member having a through hole therein, said cell unit having an inlet end of lesser diameter than the diameter of said hole and insertible into said hole and being formed with an annular external groove and a ring in said groove frictionally engaging the inner periphery of said hole, an outlet tube at the outlet end of said unit, projecting externally of said block, and means on said outlet tube to support said unit within said opening in said equally spaced relation.

6. In a gas sensitive reaction cell unit for use in a gas analyzer, the combination comprising a hollow cylindrical casing formed from a material consisting of a polymer of tetrafluoroethylene, removable conduit means at each end of said casing to connect the inside of said casing in series with a line of gas flow, and said hollow casing having a bore of predetermined diametrical dimension, a hollow cylindrical thermopile unit having smaller external diametrical dimension than the external diametrical dimension of said hollow casing, said thermopile unit being adapted to be disposed within said hollow casing with the external periphery thereof abutting against the internal periphery of said casing to effectively seal said internal and external peripheries one to the other, the thermopile of said unit comprising a plurality of longitudinal windings equally spaced within said unit and having a plurality of hot junctions at its upper end and a plurality of cold junctions at its lower end, means separating the cavity formed within said thermopile unit to provide a first cavity adjacent to the hot junction and a second cavity adjacent to the cold junction, said first cavity being adapted to receive therein a mass of material adapted to catalytically react on the gas to be tested, and the secondary cavity being adapted to receive therein a mass of chemically inert material whereby gas passing through said inert material will effect no reaction thereon while the same gas when passing through the catalyst will effect a reaction on the thermopile, said thermopile having terminals communicating with the external periphery of said casing and passing through holes therein of substantially the same diameter as the diameter of the thermopile wire wherein the inherent characteristics of the casing material effectively seals the casing to the thermopile wires.

7. In a gas sensitive reaction cell unit for use in a gas analyzer, the combination comprising a hollow cylindrical casing formed from a material consisting of a polymer of tetrafluoroethylene, removable conduit means at each end of said casing to connect the inside of said casing in series with a line of gas flow, and said hollow casing having a bore of predetermined diametrical dimension, a hollow cylindrical thermopile unit having smaller external diametrical dimension than the external diametrical dimension of said hollow casing, said thermopile unit being adapted to be disposed within said hollow casing with the external periphery thereof abutting against the internal periphery of said casing to effectively seal said internal and external peripheries one to the other, the thermopile of said unit comprising a plurality of longitudinal windings equally spaced within said unit and having a plurality of hot junctions at its upper end and a plurality of cold junctions at its lower end, means separating the cavity formed within said thermopile unit to provide a first cavity adjacent to the hot junction and a second cavity adjacent to the cold junction, said first cavity being adapted to receive therein a mass of material adapted to catalytically react on the gas to be tested, and the second cavity being adapted to receive therein a mass of chemically inert material whereby gas passing through said inert material will effect no reaction thereon while the same gas when passing through the catalyst will effect a reaction on the thermopile, said thermopile having terminals communicating with the external periphery of said casing and passing through holes therein of substantially the same diameter as the diameter of the thermopile wire wherein the inherent characteristics of the casing material effectively seals the casing to the thermopile wires, and means to retain the chemically inert mass of material and the catalyst material in cooperating relation within said thermopile unit.

References Cited in the file of this patent

UNITED STATES PATENTS

| | | |
|---|---|---|
| 1,321,063 | Lamb et al. | Nov. 4, 1919 |
| 1,578,666 | Katz | Mar. 30, 1926 |
| 1,779,569 | Thompson | Oct. 28, 1930 |
| 1,908,202 | White | May 9, 1933 |
| 1,992,747 | Gilliland | Feb. 26, 1935 |
| 2,114,401 | Price | Apr. 19, 1938 |
| 2,393,362 | Gerhold | Jan. 22, 1946 |
| 2,531,592 | Yant et al. | Nov. 28, 1950 |

OTHER REFERENCES

Larson et al.: J. of Am. Chem. Society," vol. 44, 1922, pages 20–25.